Figure 1:
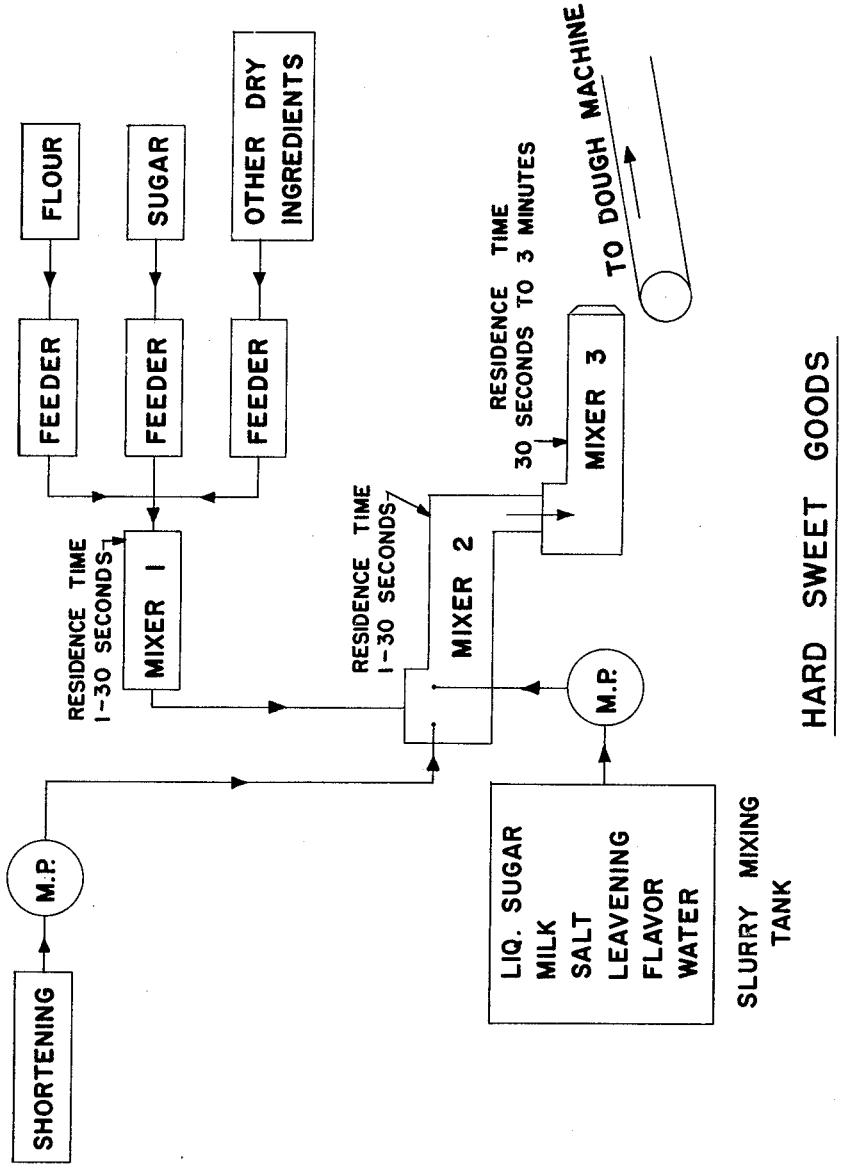

May 18, 1965 M. C. HARRIS ETAL 3,184,317
CONTINUOUS PROCESS FOR THE MANUFACTURE OF HARD SWEET DOUGH
Filed April 23, 1963

INVENTORS
MEADE C. HARRIS
ELMORE F. MAEHL,
   Deceased
BY By Eunyce Maehl
   AGENT

# United States Patent Office 3,184,317
Patented May 18, 1965

3,184,317
CONTINUOUS PROCESS FOR THE MANUFACTURE OF HARD SWEET DOUGH
Meade C. Harris, Rutherford, N.J., and Elmore F. Maehl, deceased, late of Fanwood, N.J., by Eunice Maehl, legal representative, Fanwood, N.J., assignors to National Biscuit Company, a corporation of New Jersey
Filed Apr. 23, 1963, Ser. No. 275,165
11 Claims. (Cl. 99—90)

This invention relates to the art of mixing and more specifically to a continuous process for mixing, which delivers a continuous stream of properly mixed and homogeneous material to the next reaction zone.

Although the invention is not limited to the baking industry and may readily be applied to other processing industries and to several other items of the food and baking industry, the invention is specifically useful with hard sweet goods, that is with doughs of high viscosity in which the amount of diluents, for instance water or milk is below the usual amount of other baked products, and the proportion of sugar is above 12% of the finished goods.

It has long been recognized that proper mixing of the ingredients prior to the baking stage is essential in practically all baked goods, for the attainment of a homogeneous product having desired characteristics of grain structure, texture, moisture content, flavor and color. Except for the process described in United States Patent 3,057,730, thorough mixing of all ingredients has been considered fundamental in the art.

In the commercial production of baked goods, satisfactory results have been achieved by the use of batch mixing equipment. It is clear, however, that where tons of material are to be mixed at one time, this equipment requires large floor space, is expensive in initial cost, and has high power requirement and high maintenance and replacement cost.

The continuous system on the other hand has a very high capacity relative to the size of the mixing unit, because it operates on smaller volumes than batch systems at any one time so that lower horsepower installations are permissible. Batchwide operation is more suitable where it is not possible to measure the amount of each ingredient carefully and where differences in composition of flour may give rise to unforeseen changes in consistency during mixing, because each batch may be processed for a different length of time or adapted during operation to different conditions. It is safe to conclude that whenever possible, cost-minded manufacturers have shifted to continuous processes because the machines are smaller, may be built throughout of the more expensive corrosion-resistant material, and because of more effective use of the power.

In recent years some successful results have been claimed with continuous processes for mixing doughs, batters and even bread doughs. For instance U.S.P. 2,953,460 covers a continuous process for the preparation of bread dough. U.S.P. 2,920,964 discloses and claims a process for the continuous preparation of soda cracker dough. U.S.P. 3,041,176 describes a process for the continuous mixing of flour into a slurry in a continuous mixing machine and continuously injecting a gaseous medium to aerate the slurry and to produce a risen dough, after the gas is allowed to expand.

No serious difficulties have been encountered in the art in the conversion from a batch to a continuous process, where simple blending of thin liquids and dry powders is involved. Where the diluent is present at least to the extent of 35% of the dough, as in the doughs involved in U.S.P. 2,953,460 and U.S.P. 2,920,964, continuous mixing of the ingredients has been feasible. Also in U.S.P. 3,041,176, a high proportion of water is continuously added to the flour, and in addition, gas is injected such as air or carbon dioxide, so that the mixture of ingredients is maintained sufficiently thin during mixing.

The processes and equipment described and claimed in these above-mentioned patents would not be successful with hard-sweet goods, because the dough is far more viscous than the usual batter, and contains no more than 12% of water, and as low as 6.5%, based on the total dough composition, not including water present in flour and other ingredients.

Whatever is the situation with sponge and bread dough, suffice it to say that no progress had been made prior to the present invention in the art of continuous mixing hard sweet doughs, that is hard doughs of high viscosity. Here, mixing even on a batch scale is a problem, and the manufacturer has been concerned with devising equipment at least suitable for batch operations. With attention centered in devising equipment suitable for each individual specific process, on a batch scale, little or no theory was available, prior to this invention, which might have led to any quantitative and systematized approach to the mixing on a continuous scale. Continuous mixing of hard sweet doughs was considered out of reach by the man in the art.

Admittedly some manufacturers have marketed and advertised equipment for continuously mixing hard-to-mix materials, and thermoplastic solids. These devices called masticators or continuous kneaders or extruders, are claimed to be successful with several types of hard materials. However, in our experience with hard sweet doughs, they proved far from satisfactory. Some experiments were conducted by using a combination of gravimetric and volumetric-type feeders. Flour, soda, ammonium bicarbonate were blended and discharged into the mixing zone. Other dry ingredients, namely, sugar, cocoa, egg powder, were blended and fed into the premixing zone. Liquid ingredients, lard, water, eggs, corn syrup, stored in individual holding tanks, were pumped into the premixing zone and then the mass discharged into the mixing zone. A combination of helical screws and angularly positioned paddle blades rotating at about 70 r.p.m., worked and moved the resulting mass. The time of mixing from the inlet end of the mixing zone to the discharge end was 2.5 minutes, with a rate of 3000 pounds per hour. The resulting doughs were soft and sticky suggesting that kneading was inadequate, and that hydration of the dry solids was not homogeneous. It was found to be advantageous to use a second kneader, to give additional "working" and mixing of the dough. Under these conditions, sufficiently uniform hydration and sufficient "body" was achieved so that a lay time of 15 to 30 minutes was adequate, before the next steps, cutting and baking.

A major difficulty, however, was that after a short period of operation the dough temperature began to rise due to mechanical heat development. Refrigeration was essential, necessitating a 15 H.P., 15 ton per day capacity, circulating refrigeration system. For more efficient refrigeration, two air-cooled 1½ H.P., Freon circulating units had to be installed. On occasions, during hot weather, a third 1½ H.P. refrigerating unit was used.

Although this process was significant as a first attempt in the continuous manufacture of hard sweet doughs, it is obvious that as a whole, it was far from satisfactory. The cost involved in the refrigeration was substantial, it still needed a lay-time, and in any event the process could not be run on a truly continuous scale, but could only be run for short periods of time and required just as much attention as any batch process.

It has now been found that it is possible to prepare the hard sweet dough by a continuous process and to supply a continuous stream of uniformly blended and kneaded dough to the oven without interruption and without undue development of heat. Thus the present invention represents a revolutionary advance in an art, that is, manufacture of hard sweet dough, where continuous mixing was considered an impossibility.

One object of the present invention is to provide for the continuous manufacture of hard sweet dough in a satisfactory and practical manner so as to deliver to the oven a continuous stream of fully mixed dough. Another object is to overcome the disadvantages and deficiencies which have interfered with the continuous preparation of hard sweet dough mixes.

Another object of the present invention is to provide a process whereby a hard sweet dough may be produced uniformly, in reproducible manner with fewer steps, and less labor than heretofore in the baking industry.

Another object of this invention is to provide a process which permits the preparation of hard sweet dough at greatly reduced cost, with less equipment, less space for the equipment and which requires less attention than the common batch operations.

Still another object is to provide a process which gives improved finished products with easily reproducible qualities of texture, flavor and appearance.

A fundamental object of the invention is to provide a process which insures the feed or discharge of accurately predetermined amounts of the materials throughout each period of the operation.

Another object is to provide a type of feeder which can weigh materials continuously and which continuously records the weight of the material which has been discharged.

Still a further object is to provide a process in which the dry and wet ingredients blend thoroughly before any kneading and shearing action is applied.

Another object of this instant invention is to avoid the lay-time, which in addition to delaying the operation, causes changes in the consistency of the dough if samples are compared at different intervals of time after the beginning of the operation.

The present invention involves inherently simple operations but in such a combination and sequence that it has permitted the achievement of the improved and novel process.

More specifically the present invention comprises:

(1) Accurately and continuously weighing each ingredient, in such a manner that record is kept of the material discharged, (2) Premixing the dry ingredients, flour, sugar and any other optional dry material which may be used according to specific formulations, (3) Separately melting and weighing accurately the amount of shortening and continuously discharging at a predetermined rate some shortening into the mixing zone, (4) Separately mixing the aqueous phase ingredients, for instance eggs, or egg powder, leavening agent, malt extract, invert syrup, milk or milk substitute, that is adding the water-soluble ingredients to the aqueous phase, in accurately weighed amounts, to form a slurry and continuously discharging the slurry into the mixing zone, at a preselected rate, (5) Continuously and uniformly blending the slurry with the dry material mix and the shortening with the minimum temperature rise, (6) Continuously discharging the blend into a mixing zone where the mix is subjected to kneading and shearing to produce a homogeneous well-kneaded dough with the minimum temperature rise, (7) Controlling the rate of dough advancing to the next zone, that is the cutter or the oven.

For the sake of clarity, "dough" means a mixture of flour and water and usually other optional ingredients, thick enough to knead or roll. The term "hard sweet dough" comprises generally all the formulations of flour, sugar, water, and/or milk and a shortening, as the essential ingredients, with a chemical as a leavening agent. Some optional ingredients may be present, depending on the formulation, for instance coloring or flavoring agent, cocoa, eggs, and the like. The sugar content of the hard sweet goods within the scope of this invention is high, at least 12% and as high as 21% of the total compostion. The amount of added water or in general of a diluent in the hard sweet goods is lower than in the usual batters, because it is never over 12% and as low as 6.5% of the total dough composition. The amount of shortening is higher than in the usual doughs, and is at least 8% and up to 15% of the total composition.

The consistency of hard sweet dough is far higher than in ordinary batters, and other doughs. By way of comparison, bread dough has a specific gravity less than 1, in the order of 0.6. On the other hand, the hard sweet doughs within the scope of this invention, have a specific gravity over 1, usually between 1.1 and 1.5 before the goods enter the oven.

The term "flour" is used here with reference to wheat flour, although such flour as potato flour, corn flour, and rye flour in whole or in part are also broadly within the scope of the invention. The flour used in the preparation of the hard sweet dough may have a variable protein content between 7 and 11% of protein, although it is usually preferred to use "weak" flour, that is containing between 7 and 9.5% of protein, in the preparation of sweet doughs. As a sweetening agent, cane sugar of different grade is used according to each individual formulation. Dextrose, commercially known as corn sugar, may also be used. Other types of sweetening agents, available in solution or syrup form, for instance invert syrup, levulose, honey, corn syrup, malt syrup, may, if the specific formulation calls for, be added to the aqueous slurry.

Where optional ingredients are used, they should be blended with either the shortening phase or the dry material phase or the slurry. For instance, if an emulsifier and chocolate liquor are used, they are preferably added to the shortening. As an emulsifier, lecithin or lactylated monopalmitin, may be used. Optional water-soluble ingredients, such as flavoring agents, are easily dissolved in the slurry.

An essential feature of the invention is the combination of the water-soluble ingredients in the aqueous slurry. It has been found that the flavor and color of the baked products are improved when invert syrup and a milk product are dissolved in water in the presence of an alkaline reagent, usually the soda used as the leavening agent.

It is believed that this effect is the result of a chemical reaction between the reducing sugar and the protein of milk, commonly known as the Maillard reaction. It is to be understood, however, that the scope of the present invention is not to be limited by considerations of speculative nature, particularly because reactions involving proteins are not fully known.

The process of the invention has been thoroughly tested, and at no time the temperature of the material emerging from the mixing zone, where the material is kneaded, is above 106° F. Generally the temperature is lower than 106° F., that is in the range of 90° F. to 96° F., and the temperature in the first and second mixing zone never rises above 85° F. The temperature rise in the third mixing zone, where the dough is kneaded, may be controlled, if the sequence of steps is properly controlled as described herein. This temperature range, between 90° and 106° F., is very suitable for the next operation, namely the cutting and stamping step.

For a better understanding of the invention, reference may be had to the flow sheet, FIG. 1, which gives a schematic picture of the process. The dry goods, flour, sugar, and any optional materials, for instance cocoa, are stored in tanks (not shown) so as to maintain a steady supply. From the tanks each material is fed to the bins. Cocoa is one of the optional ingredients shown in the flow sheet under "other ingredients." By "cocoa" is meant the product from the cocoa bean after cleaning, roasting and removing the hull and germ. The cocoa may be either Dutch cocoa, which is made by treating the beans during manufacture with strong caustic potash, or American cocoa or preferably, a mixture of the two, since the flavor of very light-colored untreated American cocoa is almost lost in biscuits and cookies.

It is essential to the success of the operation that the amounts of each ingredient be accurately weighed on a continuous basis, rather than measured volumetrically as used heretofore for continuous operations according to the earlier investigations. Accurate control of the amounts of each solid ingredient at this stage permits more reproducible results and has been one of the essential factors in eliminating nonuniformity and the temperature rise in the final mixing and kneading zone which prior to the present invention, had made continuous operation impractical.

Merchen feeders as described in U.S.P. 2,095,509 and 2,305,484, continuously discharging from the bins accurately weighed amounts of each solid are very satisfactory, but any metering or scale device capable of being interposed between the bins and the vessel where the solid ingredients are combined and mixed, is satisfactory as long as it provides for accurate weighing and is adaptable to a continuous operation.

The solid components are accurately measured, then led into a hopper (not shown) and then to the first mixing zone, shown in the flow sheet as Mixer No. 1, where they are thoroughly blended. It has been found essential for the smooth operation of the process to provide a mixer with high-speed-revolving shaft so that adequate blending is achieved in the period between 1 and 30 seconds. An apparatus with a shaft provided with adjustable blades, revolving at a rate between 350 and 1000 r.p.m. is satisfactory, and the temperature usually remains below 85° F.

Any device for conveying material may be used from the tanks to the bins, and from the bins to the mixer, for instance, screw conveyors, belts, rotary feeders, provided with a controllable gate or valve. It has been found particularly advantageous to use vibrators, after the material has been weighed because they provide for complete discharge with no hold up. The dry blended materials are then led to the second mixing zone, shown in the flow sheet as Mixer No. 2.

As a shortening, all-hydrogenated lard or butter may be used as well as vegetable oils, oleo oils, coconut and palm oils. Incompletely hydrogenated lard or cottonseed, corn and peanut oil may also be used in different formulations. From a flavor standpoint and where long stability is not of the essence, butter is excellent as a part of the shortening in many sweet goods.

Although we have had very satisfactory results with lard, it is to be understood that the selection of the shortening or butter or a combination of both is not a limitation on the process, but depends upon each individual formulation. In some instances, the "hard butters" of commerce may be substituted in whole or in part. The term "hard butters" indicates the products of interesterification and rearrangement of natural fats or mixtures of same which is believed to cause a "random" distribution of the fatty acid radicals in the triglyceride units. For the nature of the process of interesterification and the "random" distribution of the products, reference is made to Gilman, "Advanced Treatise of Organic Chemistry," vol. III (1953), chapter on Lipids, p. 186. If the shortening or hard butter used is in the solid phase, at room temperature, provision is made (not shown) to provide moderate heat sufficient to melt the solid. Also the shortening is continuously weighed and led into the second mixing zone, by means of a metering pump.

The third phase, that is, the aqueous phase or as it is more usually called "the slurry," contains water, a leavening agent, salt and may contain also milk or a milk substitute, invert syrup, levulose, according to the specific formulation and eggs, or egg powder. All these ingredients are carefully measured and dissolved or suspended in water in the slurry mixing tank. A metering pump accurately measures the rate of discharge of the slurry to the second mixing zone.

Leavening agent is the term used in the art to indicate a source of gas which causes a dough or batter to spring, giving a porous, open structure to the product. Several chemical agents may be used as leavening agents as described in Bohn, "Biscuit and Cracker Production," American Trade Publishing Company (1957), pp. 19–22. Very satisfactory results have been obtained with sodium bicarbonate, alone, since it decomposes during baking to give the desired carbon dioxide.

It is preferred to have all the elements of the apparatus subject to remote controls, to permit the operator to follow and regulate the course of the mixing. The table below gives variations in specific formulations of hard sweet goods, classified according to the sugar content and based on the ratio of each ingredient to flour. Thus the table shows a "Low-Sugar," a "Medium-Sugar" and a "High-Sugar" content formulation. It is to be understood, however, that the three formulations are given by way of illustration, and that broadly the hard sweet goods, within the scope of the invention, may only contain the three basic components, flour, sugar and a diluent, which is a shortening and water. Thus the term hard sweet goods within the scope of this invention broadly comprises formulations containing between 12 and 21% of sugar, between 6.5 and 12% of added water, and between 8 and 15% of shortening, these percentages being expressed with reference to the total dough composition.

Referring now to the three formulations shown in the table, variations are possible not only from one formulation to the other, but by the omission or addition of some ingredients. For instance, the use of an emulsifier, which is another optional ingredient, has not been shown in the three formulations in the table. As indicated above, the amount of water, between 6.5 and 12%, is the added water, and does not include water present, for instance, in flour and other ingredients.

|  | Low sugar | | Medium sugar | | High sugar | |
| --- | --- | --- | --- | --- | --- | --- |
|  | Lbs. | No. of lbs. per hr. | Lbs. | No. of lbs. per hr. | Lbs. | No. of lbs. per hr. |
| Dry materials: | | | | | | |
| Flour | 100 | 2,000 | 100 | 2,000 | 100 | 2,000 |
| Sugar | 21 | 420 | 33 | 660 | 47 | 940 |
| Cocoa | | | | | 20 | 400 |
| Shortening | 25 | 500 | 16.5 | 330 | 18.5 | 370 |
| Slurry: | | | | | | |
| Liq. sugar | 3 | 60 | 3 | 60 | 9 | 180 |
| Eggs | 3 | 60 | 3 | 60 | | |
| Milk | 1.25 | 25 | 1.25 | 25 | 2.5 | 50 |
| Salt | 1 | 20 | 1 | 20 | 1.25 | 25 |
| Leavening | 1 | 20 | 1 | 20 | 3 | 60 |
| Flavor | 0.06 | 1.2 | 0.25 | 5 | 1.5 | 30 |
| Water | 12 | 240 | 13 | 260 | 25 | 500 |
| Total slurry | 21.31 | 426.2 | 22.50 | 450 | 42.25 | 845 |
| Total weight | 167.31 | 3,346.2 | 172.0 | 3,440 | 227.75 | 4,555 |

It is seen from the table that the amount of flour is kept constant in each formulation and the amount of the other ingredients varied. Although in the table, the High-Sugar formulation shows that cocoa is used, where a chocolate flavor is desired, it may be possible at least partially to replace the cocoa with chocolate liquor. In this case if the cocoa is cut down to one-half, that is, 10 pounds of cocoa instead of 20 pounds, the amount of chocolate liquor is 3 to 5 pounds per 100 pounds of flour. In other words, the chocolate liquor is added at a rate of 1 to 1.8 pounds per minute.

For the successful operation of the process, the adjustment of the feeding devices of all ingredients, the rate of discharge from each mixing zone, and rate of discharge at the outlet of the third mixing zone, must be carefully controlled for each formulation. By way of illustration, and with reference to the three formulations shown in the table, the rate of feeding flour is kept constant, namely 33.33 pounds per minute, equivalent to 2000 pounds per hour. Flour may be partly supplemented with meal, that is recovered material from prior preparations, usually material rejected because broken into small pieces. Also different grades of flour or types of flour may be required, according to specific formulations. With a flour feed at the rate of 33.33 pounds per minute, the sugar rate must be adjusted to 7 pounds per minute in the low-sugar formulation, 11 pounds per minute in the medium-sugar formulation and 15.66 pounds per minute in the high-sugar formulation. When cocoa is added, as in the high-sugar formulation, the rate of feeding is 6.6 pounds per minute.

The rate of feeding of each ingredient for the three formulations shown in the table is obviously easily derived by dividing the total number of pounds of each ingredient per hour by 60. For instance the total number of pounds of aqueous slurry added per minute for each formulation is obtained by dividing the total number of pounds of aqueous slurry per hour by 60. Thus, by way of example, the rate of addition of shortening for the Low-Sugar formulation is 500/60, that is 8.3 pounds per minute, and for the Medium-Sugar formulation is 330/60 or 5.5 pounds per minute, and for the High-Sugar formulation is 370/60 or 6.1 pounds per minute.

Similarly for the total aqueous slurry, the total amount fed per minute is 426.2/60, that is 7.1 pounds per minute for the Low-Sugar formulation, 450/60, that is 7.5 pounds per minute for the Medium-Sugar formulation and 845/60, that is, 14.08 pounds per minute in the High-Sugar formulation.

The amount of salt in the low and medium sugar formulation is 0.33 pound per minute, and 0.41 pound per minute in the high-sugar formulation. The amount of milk is preferably 0.41 pound per minute in the low and medium sugar formulation and 0.83 pound per minute in the high-sugar formulation. Invert syrup and malt extract, schematically represented in the diagram as liquid sugar, are fed into the aqueous phase at a rate 1 pound per minute in the low and medium sugar formulation, and 3 pounds per minute in the high-sugar formulation.

The amount of water is pumped at a rate of 4 pounds per minute in the low-sugar formulation, 4.3 pounds per minute in the medium-sugar formulation and 8.3 pounds per minute in the high-sugar formulation.

The amount of flavoring agents varies from 0.02 pound per minute in the low-sugar formulation to 0.08 pound in the medium-sugar formulation to 0.5 pound in the high-sugar formation.

The amount of leavening agent, usually sodium bicarbonate varies between 0.33 and 1 pound per minute.

With the rate of feeding flour kept at 33.33 pounds per minute, the rate of discharge of dry solids from Mixer No. 1 in the low-sugar formulation is 40 lbs. per minute, in the medium-sugar formulation 44 lbs. per minute and in the high-sugar formulation 55.7 lbs. per minute.

As the flow sheet indicates, the dry solid phase, the liquid slurry and the shortening phase are continuously fed into the second mixing zone, namely Mixer No. 2.

Here it is essential that good blending of the dry ingredients, slurry and shortening, be achieved with a residence time between 1 and 30 seconds. This may be achieved with an apparatus in which the rotatable shaft or other mixing element revolves at a rate between 350 and 1000 r.p.m. preferably 720 r.p.m. If the conditions are carefully controlled, the temperature in the second mixing zone never rises above 85° F. Satisfactory results have been achieved with the mixer marketed by Ambrette Machinery Corporation, under the name of Cyclomixer although the invention is not limited to any particular apparatus, as long as good blending of dry ingredients, liquid ingredients and shortening is achieved in the same period of time, that is 1 to 30 seconds.

From the second mixing zone, the material is led to the third mixing zone, shown as Mixer No. 3 where efficient mixing and kneading occurs. By way of illustration and with reference to the three formulations given in the table, the rate of discharge from the second mixer in the low-sugar formulation is 55.76 pounds per minute, 57.43 pounds per minute in the medium-sugar formulation, and 75.91 pounds per minute in the high-sugar formulation.

In the third zone, which is shown in the flow sheet as Mixer No. 3, all the materials must react with water to give uniform hydration, which is essential for the achievement of a homogeneous dough.

It has now been found that homogeneity of the dough and uniform hydration may be achieved in the kneading zone with a residence time between 30 seconds and 3 minutes.

One type of apparatus used successfully in this kneading step is a slow speed mixer-extruder with shaft preferably adjusted at 40 r.p.m., although the rate of revolution may be adjusted within the range of 30 to 90 r.p.m.

Although the invention is not limited to any specific make of extruder or type of shaft, very satisfactory results were obtained with the mixer-extruder manufactured by the Reitz Manufacturing Company described here. The apparatus comprises a cylindrical housing and is provided with a rotatable shaft and cut-off blades on the shaft to mull and slice the material.

In order to provide additional kneading action, at least one and preferably two screens are positioned in the interior of the extruder, affixed to the inner walls of the housing. It was also found advantageous to attach to the inner walls of the apparatus at least a pair and preferably four plows disposed at diametrically opposite points in the inner part of the cylinder. These plow blades, inserted between the rotating blades, act as stationary anvils, and greatly contribute to kneading and fully developing the dough. The material is fed into the housing at one end, forced forward by the rotating blade onto the anvil. As the blade passes the anvil, a portion of the material is pushed forward and the remainder stays behind subject to repeated kneading action. The extrusion head is provided with a nose cone which gives additional blending and kneading action, thus insuring the production of smooth, properly kneaded, uniformly hydrated material.

It is significant that by the proper combination of steps, as described herein, it has been found unnecessary to cool by external refrigeration in any of the mixing or kneading steps, namely the first or second mixing zones as well as the extruder. The temperature at no time rises above 106° F., and is usually below 96° F. The temperature in the first and second mixing zones, namely Mixer No. 1 and Mixer No. 2, never rises above 85° F., if the steps are conducted in accordance with this instant invention. The severe kneading treatment carried out in the third zone, that is the mixer-extruder, converts the preliminary blend to a putty-like homogeneous non-sticky dough, well kneaded, of uniform hydration throughout. From the mixer-extruder the material advances at a predetermined rate towards the cutting and the stamping zone, and then to the oven. The rate of discharge, by way of illustration, is 55.76 pounds per minute in the low-sugar formulation, 57.43 pounds per minute in the medium-sugar formulation, and 75.91 pounds per minute in the high-sugar formulation.

For the purpose of better illustrating the invention, the following examples are described in detail.

Example I

A blend of wheat flour (protein content 8.5%) and sugar was continuously prepared by passing flour at the rate of 2000 lbs. per hour, corresponding to 33.33 pounds per minute and sugar at the rate of 7 pounds per minute in the first Mixer, with a residence time of 10 seconds, and shaft set at 650 r.p.m.

Lard was fed to second Mixer at a rate of 8.3 pounds per minute.

The aqueous slurry was separately prepared on a batch scale, although it may also be prepared on a continuous operation. On a batch scale, the materials sufficient for a 4 hour run were mixed, namely, 960 pounds of water, 80 pounds of salt, 240 pounds of egg powder, 100 pounds of milk, 80 pounds of leavening agent, 4.8 pounds of vanilla and 240 pounds of invert syrup. The aqueous slurry, thus prepared, was fed to the second mixer at a rate of 7.1 pounds per minute.

The dry material blend was discharged from the first mixer at a rate of 40 pounds per minute. A satisfactory blending of the three phases, shortening, dry materials and aqueous slurry was achieved in the Cyclomixer, sold by the Ambrette Machinery Corporation, with a residence time of 10 seconds, and shaft rotating at 720 r.p.m.

This blend was removed from the Cyclomixer at the rate of 55.76 pounds per minute, and passed to the Mixer-Extruder, specifically the Extruder manufactured by the Reitz Manufacturing Corporation, where the residence time was 2 minutes. The temperature in the Extruder remained throughout the operation at 95°–100° F. The material was removed from the Extruder at the rate of 55.76 pounds per minute. It was then subjected to a cutting device, and baked. The resulting goods after 120 hours of the continuous operation were of excellent quality, tender and homogeneous. The output was 3346 lbs. per hour.

Example 2

Flour (of protein content 9.5%), at the rate of 33.33 pounds per minute, and sugar at the rate of 11 pounds per minute, were mixed in the first mixer where the residence time was 30 seconds. The shaft was rotated at a speed of 650 r.p.m. The rate of discharge of the dry solids to the Cyclomixer was 44 pounds per minute. Shortening, namely lard, was discharged into the Ambrette Cyclomixer at a rate of 5.5 pounds per minute.

The aqueous slurry was prepared by combining 1040 pounds of water, 100 pounds of milk, 80 pounds of salt, 80 pounds of leavening, 20 pounds of vanilla, 240 pounds of liquid sugar, 240 pounds of egg powder, that is the ingredients required for a 4 hour operation. The aqueous slurry was discharged into the Cyclomixer at a rate of 5.5 pounds per minute. The residence time in the Cyclomixer was 15 seconds, and in the Reitz extruder, that is the third mixing zone, it was 2.5 minutes. The temperature in the Reitz extruder did not exceed 95° F., and remained mostly between 90° and 92° F., throughout the operation of 90 hours.

After cutting and baking, the goods were crispy, light, homogeneous in flavor, appearance and weight. There was no change in the quality of the finished goods at the end of the operation, which gave an output of 3440 pounds per hour.

Example 3

Flour at a rate of 33.33 pounds per minute and sugar at the rate of 15.66 pounds per minute were continuously fed into the first mixing zone. Cocoa was sieved, cooled to below 70° F. and fed to the same first Mixer at a rate of 6.6 pounds per minute. With a residence time of 15 seconds and with a shaft rotating at 690 r.p.m., a good premixing of the three dry ingredients was achieved. The dry solids were fed into the Cyclomixer at a rate of 55.6 pounds per minute.

Lard was fed into the Cyclomixer at a rate of 6.1 pounds per minute. The aqueous slurry was prepared in a batch for a 4 hour operation, namely 2000 pounds of water, 720 pounds of invert syrup, 200 pounds of milk powder, 100 pounds of salt, 240 pounds of leavening, 120 pounds of vanilla. In the Cyclomixer, the dry solids, the slurry and shortening were blended with a residence time of 20 seconds and fed into the extruder at a rate of 75.91 pounds per minute. The residence time in the extruder was 1.5 minutes, with a shaft rotating at 46 r.p.m. The rate of extrusion from the extruder was 75.91 pounds per minute. The mixing was continued for 70 hours, with an output of 4555 pounds per hour, giving a very satisfactory homogeneous dough.

Although not shown in the table or in the diagram, an edible emulsifier may be added either to the shortening or to the aqueous slurry, in amount of 1 to 4 ounces per 100 pounds of flour. As edible emulsifier, lecithin or glyceryl lacto palmitate may be used, manufactured by Atlas Powder Company.

As a further proof of the function of each step of the process in accordance with the instant invention, and particularly the function of Mixer No. 2 and the function of Mixer No. 3, moisture content determinations have been performed with the Low-Sugar, Medium-Sugar and High-Sugar formulations. The moisture content determinations were conducted by the toluene test, by removing samples of dough at the outlet of Mixer No. 2 and also Mixer No. 3. The samples were removed at uniform time intervals, as well as several samples were simultaneously removed from the same zone. The moisture content was the same, within the limit of experimental error, thus indicating that blending of water with the other ingredients is achieved in Mixer No. 2, and that the Mixer No. 3 does not contribute to the uniform distribution of the water, and other ingredients. On the other hand, the dough at the outlet of Mixer No. 2 has the appearance and texture of coffee ground, that is, although well blended, has no body. As it leaves Mixer No. 3, the dough has putty-like appearance and is well kneaded, indicating that the function of Mixer No. 3 is to cause uniform hydration of the dough.

From the foregoing, it may be seen that this invention constitutes a substantial advance in the art of mixing hard sweet goods, because it makes possible the continuous mixing of hard sweet dough, in an economic, homongeneous and reproducible fashion. The doughs prepared according to this instant invention, are not only a mass of well blended ingredients, but the dough has been kneaded to achieve uniformly the desired degree of hydration, which is necessary for full development of the doughs prior to cutting, stamping and baking. Departures from the specific illustrations given herein are within the scope of the invention, which is to be limited only by the appended claims.

What is claimed is:

1. The continuous process for the manufacture of hard sweet doughs which contain between 12 and 21% of sugar, which comprises:
    (a) continuously feeding into a mixing zone, flour at a rate of 33.33 pounds per minute, sugar at a rate between 7 and 16 pounds per minute, cocoa at a rate between 0 and 6.6 pounds per minute mechanically agitating said ingredients in said mixing zone, to form a blend with a residence time between 1 and 30 seconds at a temperature not exceeding 85° F. and discharging said blend at a rate of 40 to 55.7 pounds per minute into a second mixing zone,
    (b) feeding into said second mixing zone shortening at a rate of 5 to 9 pounds per minute and a slurry, which is continuously prepared from water at a rate between 4 and 8 pounds per minute, invert syrup between 1 and 3 pounds per minute, milk, between 0.4 and 0.8 pound per minute, salt between 0.4 and 0.4 pound per minute, a leavening agent between 0.3 and 1 pound per minute, and flavoring agent between 0.02 and 0.5 pound per minute mechanically agitating and forming a mix of said slurry, said shortening, and said dry ingredients in said second mixing zone, with a residence time between 1 and 30 seconds at a temperature not exceeding 85° F. and discharging said mix at a rate of 55 to 76 pounds per minute into a third mixing zone,
    (c) kneading said mix in said third mixing zone to give uniform hydration of said ingredients with a residence time of 30 seconds to 3 minutes at a temperature not exceeding 106° F. and discharging said dough from said kneading zone at a rate of 55 to 76 pounds per minute.

2. The process according to claim 1 wherein lecithin is added to said shortening in amount between 1 and 4 ounces per 100 pounds of flour.

3. The process according to claim 1 wherein said shortening is present in the proportion of 8 to 15% of said doughs, and said doughs have a specific gravity between 1.1 and 1.5, and a continuous flow of kneaded dough is fed to the next reaction zone at a rate between 3346 and 4555 pounds per hour.

4. The process according to claim 1 wherein a mixing element rotates in said first and said second mixing zones at a speed between 350 and 1000 r.p.m. and a mixing element rotates in said third kneading zone at a speed of between 30 and 90 r.p.m.

5. The continuous process of mixing the dough of hard-sweet goods which comprise as dry dough ingredients wheat flour and sugar, and as diluents, water and shortening, and other water soluble ingredients, said water being present in amount not exceeding 12% of the total dough composition, which comprises:
    (a) continuously feeding each of said dry dough ingredients, at a predetermined rate into a first mixing zone where said ingredients are agitated and mixed with a residence time between 1 and 30 seconds, at a temperature not exceeding 85° F.
    (b) continuously feeding said water and said water-soluble ingredients at a predetermined rate, into a common receptacle, whereby an aqueous slurry is continuously formed,
    (c) continuously feeding said shortening and said dry solid mix and said aqueous slurry into a second mixing zone, and mechanically agitating, whereby a uniform blend is achieved, at a temperature not exceeding 85° F., with a residence time between 1 and 30 seconds,
    (d) continuously discharging said blend to a kneading zone, continuously kneading said blend at a temperature not exceeding 106° F., whereby a uniformly hydrated dough is obtained with a residence time between 30 seconds and 3 minutes.

6. The process according to claim 5 wherein each of said ingredients is continuously weighed.

7. The process according to claim 5 wherein said first mixing zone is adapted to receive a plurality of dry solid components, and at least a member selected from the group consisting of cocoa, corn flour, potato flour and rye flour is discharged at a predetermined rate into said first mixing zone, simultaneously with said sugar and wheat flour.

8. The process according to claim 5 wherein a leavening agent is present in said aqueous slurry.

9. The process according to claim 5 where an edible emulsifier is added to said shortening.

10. The process according to claim 9 wherein said emulsifier is lecithin, added in amount of 1 to 4 ounces per 100 pounds of flour.

11. The process according to claim 5 wherein the temperature in said kneading zone is between 90° and 96° F.

References Cited by the Examiner

UNITED STATES PATENTS

| | | | |
|---|---|---|---|
| 2,953,460 | 9/60 | Baker. | |
| 3,041,176 | 6/62 | Baker | 99—90 |
| 3,057,730 | 10/62 | Morck | 99—92 X |
| 3,108,878 | 10/63 | Higashiuchi et al. | 99—90 |

A. LOUIS MONACELL, *Primary Examiner.*

RAYMOND N. JONES, *Examiner.*